US012743671B2

(12) United States Patent
Arora et al.

(10) Patent No.: US 12,743,671 B2
(45) Date of Patent: Sep. 22, 2026

(54) AUTOMATED MANAGEMENT OF SUPPORT CHANNEL AND TICKETING

(71) Applicant: T-Mobile Innovations LLC, Overland Park, KS (US)

(72) Inventors: Charu Arora, Bothell, WA (US); Belete Regassa Cheneke, Seattle, WA (US); Wai Jen Wayne Cheung, Seattle, WA (US); Dana Michelle Chinn, Redmond, WA (US); Eric Robert Dykema, Granite Falls, WA (US); Mohammed Haaris Edhi, Irving, TX (US); Peter James Kay, II, Frisco, TX (US); Haby Poulo Randall, Newcastle, WA (US); Xiaoyi Tian, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 56 days.

(21) Appl. No.: 18/753,848

(22) Filed: Jun. 25, 2024

(65) Prior Publication Data

US 2025/0390823 A1 Dec. 25, 2025

(51) Int. Cl.
*G06Q 10/0633* (2023.01)
*G06Q 10/0631* (2023.01)
(Continued)

(52) U.S. Cl.
CPC ... *G06Q 10/0633* (2013.01); *G06Q 10/06316* (2013.01); *G06Q 30/015* (2023.01); *H04L 41/5074* (2013.01)

(58) Field of Classification Search
None
See application file for complete search history.

(56) References Cited

U.S. PATENT DOCUMENTS

2019/0347668 A1* 11/2019 Williams ........... G06Q 30/0201
2020/0007474 A1* 1/2020 Zhang .................... G06Q 10/06
(Continued)

OTHER PUBLICATIONS

Zaidi, et al., "A multiapproach generalized framework for automated solution suggestion of support tickets," 2022, International Journal of Intelligent Systems, vol. 37, No. 6, pp. 3654-3681 (Year: 2022).*

*Primary Examiner* — Ivan R Goldberg

(57) ABSTRACT

In some examples, a system provides user technical support via an integrated support application that a messaging extension integrating messaging functionality into the integrated support application and a support ticketing extension integrating support ticketing into the integrated support application. A server stores the integrated support application, messaging extension, and support ticketing extension. The integrated support application configured to receive, from a messaging application and via an application programming interface of the messaging application, a message from a user initiating a technical support session, process the message to determine a technical problem, perform an action to mitigate the technical problem, responsive to the action resolving the technical problem, terminate the technical support session, responsive to the action not resolving the technical problem and the user selecting, via the messaging application, to generate a support ticket, interfacing with a support ticketing application to generate the support ticket in the support ticketing application.

20 Claims, 4 Drawing Sheets

(51) Int. Cl.
*G06Q 30/015* (2023.01)
*H04L 41/5074* (2022.01)

(56) References Cited

U.S. PATENT DOCUMENTS

| | | | | |
|---|---|---|---|---|
| 2020/0329144 | A1* | 10/2020 | Morgan | G06N 20/00 |
| 2021/0089384 | A1* | 3/2021 | Eberlein | G06F 11/0793 |
| 2022/0398598 | A1* | 12/2022 | Das | G06N 5/01 |
| 2023/0129123 | A1* | 4/2023 | Wang | G06Q 10/10<br>705/7.26 |

* cited by examiner

AUTOMATED MANAGEMENT OF SUPPORT CHANNEL AND TICKETING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In certain environments, such as enterprise environments, providing technical support to users can be a complicated task. For example, the technical support may touch on numerous employee, engineering, or support groups, technical systems, communication modalities, and the like. In some instances, a user may be directed to multiple of these groups, systems, or modalities as the user seeks to receive technical support for a technical problem. Such a process may be cumbersome for the user, may result in the entry of incorrect or inconsistent information, duplicate information entry, wasted resources through support engineers being deployed to resolve problems that a user could have resolved themselves with little to no direction, and other similar challenges.

SUMMARY

In some examples, a system provides user technical support via an integrated support application that a messaging extension integrating messaging functionality into the integrated support application and a support ticketing extension integrating support ticketing into the integrated support application. The system includes a data store and a server storing the integrated support application having the messaging extension and the support ticketing extension. The integrated support application is configured to receive, from a messaging application and via an application programming interface of the messaging application, a message from a user, wherein the message initiates a technical support session, process the message to determine a technical problem identified in the message, and responsive to determining the technical problem, perform an action to mitigate the technical problem. Responsive to the action resolving the technical problem, the integrated support application is configured to terminate the technical support session, automatically generate a first support ticket by interfacing, via the support ticketing extension, with a support ticketing application, record information related to the technical support session; and automatically close the first support ticket by interfacing, via the support ticketing extension, with the support ticketing application. Responsive to the action not resolving the technical problem, the integrated support application is configured to prompt, via the messaging application, the user to generate a second support ticket. Responsive to the user selecting, via the messaging application, to generate the second support ticket, interfacing, via the support ticketing extension, with a support ticketing application to generate the second support ticket in the support ticketing application.

In some examples, a method for performing user technical support via an integrated support application that integrates messaging, support ticketing, and automatic problem resolution includes receiving, at the integrated support application from a messaging application and via an application programming interface of the messaging application, a message from a user, wherein the message initiates a technical support session, processing, by the integrated support application, the message to determine a technical problem identified in the message, responsive to determining the technical problem, performing, via the integrated support application, machine intelligence processing based on the determined technical problem to determine at least one action useful in mitigating the determined technical problem, mitigating, via the integrated support application, the determined technical problem based on the determined action, responsive to the determined action resolving the determined technical problem, terminating, via the integrated support application, the technical support session, and responsive to the determine action not resolving the determined technical problem, generating, via the integrated support application, a support ticket in a support ticketing application.

In some examples, a method for performing user technical support via an integrated support application that integrates messaging, support ticketing, and automatic problem resolution includes receiving, at an integrated support application from a messaging application and via an application programming interface of the messaging application, a message from a user, wherein the message initiates a technical support session, processing, via the integrated support application, the message to determine a technical problem identified in the message, responsive to determining the technical problem, identifying, via the integrated support application, written materials related to the determined technical problem, providing, via the integrated support application, access to the written materials to the user via the messaging application, responsive to the written materials resolving the determined technical problem, terminating, via the integrated support application, the technical support session, and responsive to the written materials not resolving the determined technical problem, generating, via the integrated support application, a support ticket in a support ticketing application to generate the support ticket in the support ticketing application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
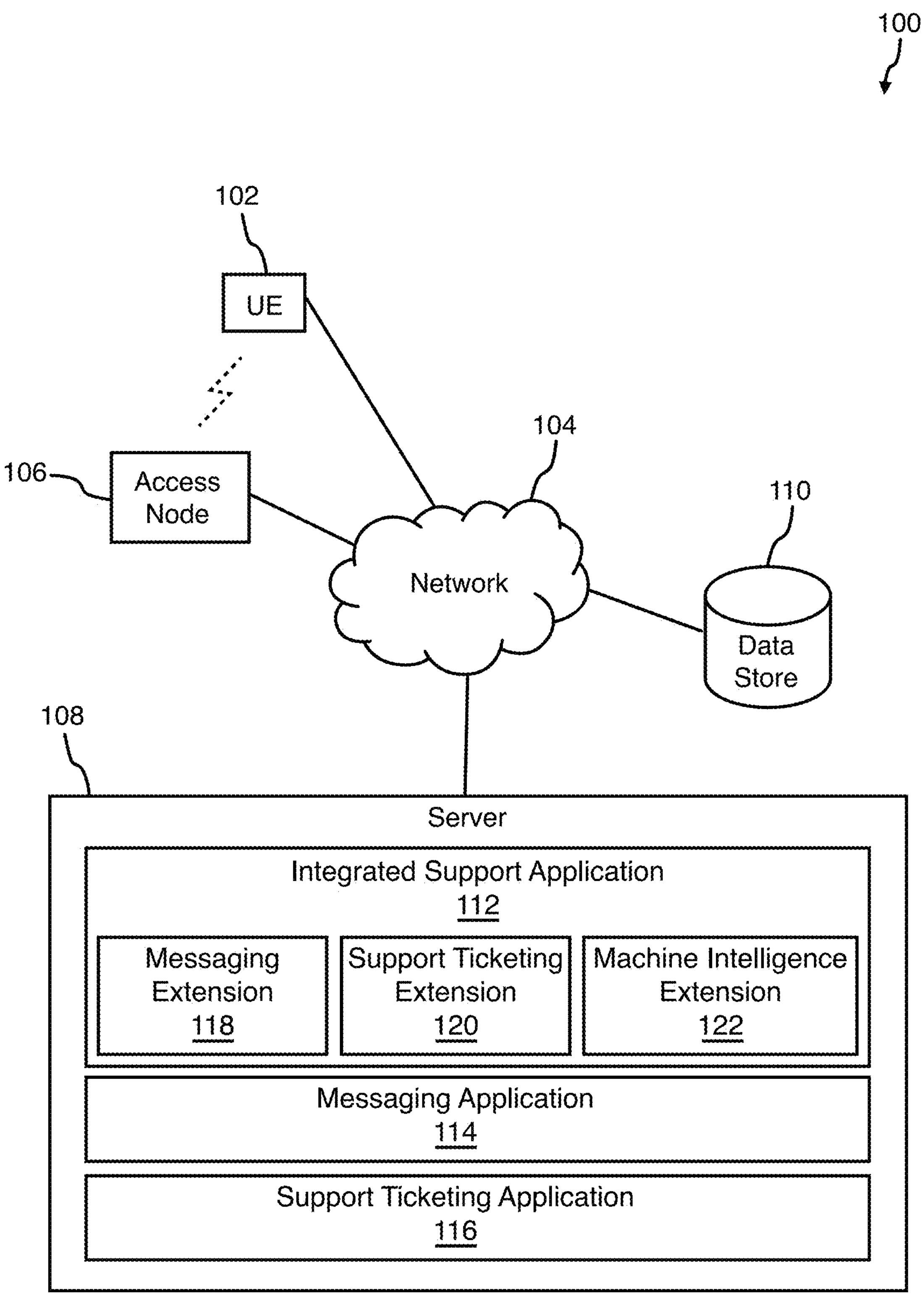
FIG. 1 is a block diagram of a system according to an example of the disclosure.

It should be understood at the outset that although illustrative implementations of one or more examples are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, in certain environments, such as enterprise environments, providing technical support to users can be a complicated task. For example, the technical support may touch on numerous employees, engineering, or support groups, technical systems, communication modalities, and the like. In some instances, a user may be directed to multiple of these groups, systems, or modalities as the user seeks to receive technical support for a technical problem. Such a process may be cumbersome for the user, may result in the entry of incorrect or inconsistent information, duplicate information entry, wasted resources through support engineers being deployed to resolve problems that a user could have resolved themselves with little to no direction, and other similar challenges. For example, a user may initiate a support session by sending a message in a message thread of a messaging application. Responsive to the message, the user may be prompted to leave the messaging application and initiate a support ticket in a second application (or website). The user may then be prompted to return to the messaging application and provide identifying information of the support ticket. After entering the information of the support ticket, the user may have to wait for a support engineer to enter the message thread to handle the support ticket. Such an approach may be both cumbersome to the user and wasteful of support resources.

Examples of this disclosure provide for an integrated support process. The integrated support process may integrate handling of support tickets into messaging applications with which a user may interact to request support. The integrated support process may also interface between the messaging applications and support applications, such that the user may send and receive messages related to a support request from within the messaging application and a support engineer may send and receive messages related to a support request from within a support application, with the integrated support process interfacing between, or among, the various applications. In some examples, the integrated support process is an automated bot, or "bot" for short.

In an example, a user seeking technical support may enter a messaging application. The messaging application may be an application such as Slack, Microsoft Teams, Zoom, or any other commercially available, or privately developed, application having messaging functionality. In some examples, the messaging application may be organized into threads, channels, groups, or other logical separations such that a particular technical area (e.g., a particular piece of software, etc.) for which a user may seek technical support may be associated with one of these logical separations. Responsive to the user posting a message to one of these logical separations of the messaging application, the bot may intercept, read, or otherwise receive the message. In some examples, the bot interfaces with the messaging application via an application programming interface (API) of the messaging application that enables integration of the bot, or other software applications, with the messaging application.

Responsive to intercepting the message, the bot may act based on the message. For example, the bot may identify previous communications occurring in the messaging application which may be useful in providing technical support to the user. The bot may provide a link or other reference to identify the previous communications to the user. In another example, the bot may identify literature, such as operating instructions, support documentation, technical articles, website (such as support forums or message boards) that may be useful in providing technical support to the user. The bot may identify the literature to the user, prompt or encourage the user to review the literature, or automatically present at least some of the literature to the user. In some examples, the bot may identify the previous communications and/or the literature according to keyword searching based on one or more words included in the message posted by the user, based on natural language processing of the message, or any other suitable analysis method of the message posted by the user. In some examples, the bot may further receive additional input from the user, such as log files, an error code, software and/or hardware characteristics, or any other suitable information that may be useful in providing the technical support. In some examples, the bot may identify the previous communications and/or the literature at least in part according to this additional input. After identifying the previous communications and/or literature to the user, the bot may query the user to determine whether the provided information was useful in providing technical support, whether a technical problem giving rise to the request for technical support has been resolved, or the like.

In some examples, the bot may determine one or more actions that may be useful in providing technical support. For example, the bot may implement an artificial intelligence (AI), machine learning (ML), or other machine intelligence process to determine one or more actions that may be useful in providing technical support. In an example, the machine intelligence process (which may encompass AI and/or ML) may be trained based on one or more data sets. In various examples, the machine intelligence process may be trained based on the previous communications and/or literature described above. In some examples, the machine intelligence process may be trained based on previous support interactions, such as actions performed by a support engineer to solve technical problems, based on survey responses from users indicating the usefulness of certain materials or actions in providing technical support, or the like. The training may be according to any suitable machine intelligence training process, the scope of which is not limited herein. In some examples, the bot may present the user with a survey or other feedback opportunity during, or following, a technical support session. The bot may train, or refine the training, of the machine intelligence process based on that feedback. Based on this feedback and training process, handling by the bot of a given technical problem presented by a user may be modified in a second technical support session based on feedback presented by another user responsive to a first technical support session preceding the second technical support session.

In some examples, the bot may itself perform one or more actions that may be useful in providing technical support. For example, based on the machine intelligence, the bot may identify one or more actions to take that may be useful in providing technical support. In some examples, the bot performs one or more of the actions automatically. In other examples, the bot prompts the user for permission to perform one or more of the actions. The actions may be actions performed on, or to, a device of the user, actions performed on, or to, a device to which the user device connects (such as a network, server, or the like), or a combination thereof. For example, the bot may send a signal causing the user device to reset or power cycle, to reset a network connection of the user device, to restart an application executing on the user device, to clear a cache of the user device, or the like. Similarly, the bot may send a signal causing a user account or password of the user to be reset, data to be provisioned (such as granting the user, user device, an application, or the like) with certain access privileges, or any other suitable actions, the scope of which is not limited herein.

Responsive to the user indicating that the technical problem has been resolved, such as based on the previous communications or literature identified by the bot to the user, the actions recommended by the bot, or the actions taken or performed by the bot, the technical support session may end. In some examples, responsive to the technical problem having been resolved, such as based on the previous communications or literature identified by the bot to the user, the actions recommended by the bot, or the actions taken or performed by the bot, the bot may create a support ticket associated with the technical problem. In some examples, the bot creates the support ticket automatically without further intervention from the user, a support engineer, or other person, while in other examples the bot may seek authorization for creating the support ticket, such as by prompting the user, a support engineer, or other person to authorize creation of the support ticket, provide a summary of the proposed support ticket to seek authorization, or the like. The bot may record information related to the technical problem, record actions taken to resolve the technical problem, and close the support ticket as resolved. The bot may create the support ticket to, for example, enable tracking of the technical problem, efficacy of the bot, such as the actions recommended, taken, or performed by the bot, efficacy of the previous communications or literature identified by the bot to the user, or the like. Creation of the support ticket may enable consideration of the support ticket and its contents by an analytics application, such as described below herein.

However, in some examples, the previous communications or literature identified by the bot to the user, or the actions recommended by the bot, do not resolve the technical problem. In such examples, the bot may prompt the user to generate a support ticket or otherwise escalate the technical support session. For example, the bot may present the user with a query via the messaging application to determine whether the technical problem has been resolved. Responsive to an affirmative response from the user, the bot may present the user with a survey or questionnaire to determine efficacy of the interaction with the bot for resolving the technical problem, or any other information which may be useful in refining or modifying operation of the bot for subsequent user interactions.

Responsive to a negative response from the user, the bot may present the user with a prompt to generate a support ticket or otherwise escalate the technical support session. Responsive to the user interacting with the prompt in the messaging application, the bot may interface with a support ticketing application to create a support ticket to escalate the technical problem. The bot may provide a notification in the messaging application that the support ticket has been created, as well as provide information related to the support ticket, such as a link to the support ticket, a ticket number, a date and time at which the support ticket was generated, or the like.

Responsive to creation of the support ticket, a support engineer may be notified by the support ticketing application. In some examples, the support engineer interacts with the support ticket, and by extension the user, through the support ticketing application. As such, the bot may interface between the support ticketing application and the messaging application to obtain messages in a first of the applications and deliver the messages in a second of the applications, and vice versa. In other examples, the support engineer interacts with the user through the messaging application.

In an example, the bot provides the support engineer with information related to the technical problem. For example, the bot may provide the support information with information describing the technical problem, troubleshooting steps taken by the user, troubleshooting steps taken by the bot, information provided to the user, potential resolutions determined by the bot, or other information that may be useful to the support engineer in troubleshooting the technical problem. In some examples, the bot includes at least some of this information in the support ticket. In other examples, the bot provides one or more messages or notifications to the support engineer, such as via the support ticketing application, including at least some of the information.

In some examples, responsive to resolution of the technical problem by the support engineer, or subsequent escalated support, the bot prompts the user to close the support ticket. For example, the bot may provide a notification in the messaging application prompting the user to close the support ticket. Responsive to the user selecting to close the support ticket, the bot may interface with the support ticketing application to close the support ticket. Responsive to closing of the support ticket, the bot may present the user with a survey or questionnaire, as described above. Similarly, the bot may retrain or refine operation of the machine intelligence based on the feedback received from the user, information related to the technical problem and its determined resolution (such as indicated in the support ticket), or the like.

In some examples, the bot may interface with an analytics application to report analytics related to operation of the bot, resolution (or nonresolution) of the technical problem, actions taken by the support engineer, or any other suitable information. The analytics application may distill the received information into useful reports or metrics indicative of support performance, efficiency, or the like, and provide these results for subsequent analysis, reporting, or display.

Turning now to FIG. 1, a system 100 in accordance with various examples is described. In an example, the system 100 includes a user device 102, a network 104, an access node 106, a server 108, and a data store 110. In some examples, the server 108 includes multiple applications, including an integrated support application 112 (which may implement the bot described herein), a messaging application 114, a support ticketing application 116, and any other suitable applications. The server 108 may be implemented as a computer system. Computer systems are described further herein with reference to FIG. 4. While the applications 112, 114, 116 are shown as being executed by the server 108, in various examples any one or more of the applications 112, 114, 116 may be executed by other servers (not shown), under control of the same or different parties, the scope of which is not limited herein. In an example, the network 104 provides communication connectivity to the user device 102 and the server 108. For example, the network 104 may be one or more private networks, one or more public networks, or a combination thereof. The network 104 may comprise a public switched telephone network (PSTN). The network 104 may comprise the Internet.

In some examples, the user device 102 communicates with the network 104, and by extension the server 108 and/or data store 110 through wired communication. In other examples, the user device 102 communicates with the network 104, the server 108, and/or data store 110 wirelessly via the access node 106. The access nodes 106 may be said to establish an access network. The access network may be referred to as a radio access network (RAN) in some contexts. In a 5G technology generation an access node 106 may be referred to as a next Generation Node B (gNB). In 4G technology (e.g., long-term evolution (LTE) technology) an access node 106 may be referred to as an evolved Node B (eNB). In 3G technology (e.g., code division multiple access (CDMA) and global system for mobile communication (GSM)) an access node 106 may be referred to as a base transceiver station (BTS) combined with a base station controller (BSC). In some contexts, the access node 106 may be referred to as a cell site or a cell tower. In some implementations, a picocell may provide some of the functionality of an access node 106, albeit with a constrained coverage area. Each of these different examples of an access node 106 may be considered to provide roughly similar functions in the different technology generations.

In an example, a user may use the user device 102 to perform various actions. Responsive to a technical problem arising with the user device 102, or with a device, application, or service with which the user is interacting via the user device 102, the user may seek technical support in furtherance of resolving the technical problem. To seek the technical support, the user may send communication(s) (e.g., one or more messages), via the user device 102 or another device, using the messaging application 114. For example, the messaging application 114 may facilitate the posting of messages and the reading of messages posted by others. In some examples, the messaging application 114 is organized into one or more groups, channels, threads, or other logical separations where each logical separation may correspond to a particular area (e.g., application, service, device, etc.) for technical support. In various examples, the messaging application 114 may be Slack, Microsoft Teams, Zoom, or any other commercially available, or privately developed, application having messaging functionality.

In an example, the integrated support application 112 includes a messaging extension 118. The messaging extension 118 may be an interface between the integrated support application 112 and the messaging application 114. For example, the integrated support application 112 may read, receive, or intercept messages from the messaging application 114 via the messaging extension 118 and may write, deliver, or otherwise provide messages to the messaging application 114 via the messaging extension 118. In some examples, the integrated support application 112, through the messaging extension 118, interfaces with the messaging application 114 via one or more application programming interfaces (APIs) of the integrated support application 112 and/or the messaging application 114.

Responsive to receiving, retrieving, or otherwise obtaining a message from the messaging application 114, the integrated support application 112 may determine information related to the technical problem experienced by the user. In some examples, the integrated support application 112 performs natural language, or other machine intelligence based, processing on the message to determine a subject, context, or other information from the message. In other examples, the integrated support application 112 performs a keyword search of the message based on a preset, programmed, or otherwise defined keyword dictionary, which may be stored in the data store 110. The integrated support application 112 may determine the information related to the technical problem based on the keyword(s) identified from the user's message. In yet other examples, the integrated support application 112 presents the user with a questionnaire having a known collection of questions to aid in identifying and/or resolving the technical problem, and the integrated support application 112 may determine the information related to the technical problem based on the user's responses to this questionnaire.

Responsive to determining the information related to the technical problem, the integrated support application 112 may perform one or more actions, such as to mitigate the technical problem. In an example, responsive to determining the information related to the technical problem, the integrated support application 112 may confirm with the user that the determined information related to the technical problem is correct. The integrated support application 112 may solicit the confirmation by providing a message in the messaging application 114 to which the user may respond. In other examples, responsive to determining the information related to the technical problem, the integrated support application 112 may provide the user with documentation that may be useful in resolving the technical problem. For example, based on the information related to the technical problem, the integrated support application 112 may search the data store 110, the Internet, or another data source for documentation, support documents, or other written materials related to the technical problem or which may be useful in mitigating, resolving, or otherwise addressing the technical problem.

The integrated support application 112 may provide one or more of the identified documentations to the user by providing a message in the messaging application 114, such as providing a link to the documentation, providing a copy of the documentation, or the like. In some examples, the integrated support application 112 may provide a first documentation and, responsive to the user indicating that the first documentation did not resolve the technical problem, may provide a second (or further subsequent) documentation until all documentation related to the technical problem and identified by the integrated support application 112 has been provided to the user, until a programmed number of documentation related to the technical problem and identified by the integrated support application 112 has been provided to the user, or the like. Responsive to the user indicating that the technical problem has been resolved, the integrated support application 112 may end the technical support session. For example, the integrated support application 112 may present the user with a query via the messaging application 114 to determine whether the technical problem has been resolved. Responsive to an affirmative response from the user, the integrated support application 112 may end the technical support session. In some examples, the integrated support application 112 may present the user with a survey or questionnaire to determine efficacy of the interaction with the integrated support application 112 for resolving the technical problem, usefulness of various documentation provided by the integrated support application 112 to the user, or any other information which may be useful in refining or modifying operation of the integrated support application 112 for subsequent interactions with users, technical support sessions, or the like.

As described above, in some examples, the technical problem may not be resolved based on the documentation provided to the user by the integrated support application 112. For example, responsive to the user providing a negative response to a query by the integrated support application 112 regarding resolution of the technical problem based on the provided documentation, the integrated support application 112 may present the user, via the messaging application 114, with a prompt to generate a support ticket or otherwise escalate the technical support session. Responsive to the user interacting with the prompt in the messaging application 114, the integrated support application 112 may interface with the support ticketing application 116 to create a support ticket to escalate the technical problem. The integrated support application 112 may provide a notification in the messaging application 114 that the support ticket has been created, as well as provide information related to the support ticket, such as a link to the support ticket, a ticket number, a date and time at which the support ticket was generated, or the like.

In an example, the integrated support application 112 includes a support ticketing extension 120. The support ticketing extension 120 may be an interface between the integrated support application 112 and the support ticketing application 116. For example, the integrated support application 112 may provide data to, or receive or otherwise obtain information from, the support ticketing application 116 via the support ticketing extension 120. In some examples, the integrated support application 112, through the support ticketing extension 120, interfaces with the support ticketing application 116 via one or more APIs of the integrated support application 112 and/or the support ticketing application 116.

Responsive to creation of the support ticket, a support engineer may be notified by the support ticketing application 116. In some examples, the support engineer interacts with the support ticket, and by extension the user, through the support ticketing application 116. As such, the integrated support application 112 may interface between the support ticketing application 116 and the messaging application 114 to obtain messages in a first of the applications and deliver the messages in a second of the applications, and vice versa. In other examples, the support engineer interacts with the user through the messaging application 114.

In an example, the integrated support application 112 provides the support engineer with information related to the technical problem. For example, the integrated support application 112 may provide the support information with information describing the technical problem, troubleshooting steps taken by the user, troubleshooting steps taken by the integrated support application 112, information provided to the user, potential resolutions determined by the integrated support application 112, or other information that may be useful to the support engineer in troubleshooting the technical problem. In some examples, the integrated support application 112 includes at least some of this information in the support ticket. In other examples, the integrated support application 112 provides one or more messages or notifications to the support engineer, such as via the support ticketing application 116, including at least some of the information.

In some examples, responsive to resolution of the technical problem by the support engineer, or subsequent escalated support, the integrated support application 112 prompts the user to close the support ticket. For example, the integrated support application 112 may provide a notification in the messaging application 114 prompting the user to close the support ticket. Responsive to the user selecting to close the support ticket, the integrated support application 112 may interface with the support ticketing application 116 to close the support ticket. Responsive to closing of the support ticket, the integrated support application 112 may present the user with a survey or questionnaire, as described above. Similarly, the integrated support application 112 may retrain or refine operation of machine intelligence of the integrated support application 112 based on the feedback received from the user, information related to the technical problem and its determined resolution (such as indicated in the support ticket), or the like.

In some examples, prior to identifying the documentation, or responsive to the user indicating that the documentation did not resolve the technical problem and before prompting the user to open a support ticket, the integrated support application 112 may implement an AI, ML, or other machine intelligence process to determine one or more actions that may be useful in providing technical support to resolve, address, or mitigate the technical problem. In an example, the machine intelligence process (which may encompass AI and/or ML) may be trained based on one or more data sets. In various examples, the machine intelligence process may be trained based on the previous communications and/or literature/documentation described above. In some examples, the machine intelligence process may be trained based on previous support interactions, such as actions performed by a support engineer to solve technical problems, based on survey responses from users indicating the usefulness of certain materials or actions in providing technical support, or the like. The training may be according to any suitable machine intelligence training process, the scope of which is not limited herein. In some examples, the integrated support application 112 may present the user with a survey or other feedback opportunity during, or following, a technical support session. The integrated support application 112 may train, or refine the training, of the machine intelligence process based on that feedback. Based on this feedback and training process, handling by the integrated support application 112 of a given technical problem presented by a user may be modified in a second technical support session based on feedback presented by another user responsive to a first technical support session preceding the second technical support session.

In some examples, the integrated support application 112 may itself perform one or more actions that may be useful in providing technical support. For example, based on the machine intelligence, the integrated support application 112 may identify one or more actions to take that may be useful in providing technical support. In some examples, the integrated support application 112 performs one or more of the actions automatically. In other examples, the integrated support application 112 prompts the user, such as via the messaging application 114 or the user device 102, for permission to perform one or more of the actions. The actions may be actions performed on, or to, the user device 102, actions performed on, or to, a device to which the user device 102 connects (such as a network, server, or the like), or a combination thereof. For example, the integrated support application 112 may send a signal causing the user device 102 to reset or power cycle, to reset a network connection of the user device 102, to restart an application executing on the user device 102, to clear a cache of the user device 102, or the like. Similarly, the integrated support application 112 may send a signal causing a user account or password of the user to be reset, data to be provisioned (such as granting the user, user device 102, an application, or the like) with certain access privileges, or any other suitable actions, the scope of which is not limited herein.

Responsive to the user indicating that the technical problem has been resolved, such as based on the previous communications or literature identified by the integrated support application 112 to the user, the actions recommended by the integrated support application 112, or the actions taken or performed by the integrated support application 112, the technical support session may end and the user may not be promoted to open a support ticket. However, in some examples, the previous communications or literature identified by the integrated support application 112 to the user, or the actions recommended by the bot, do not resolve the technical problem. In such examples, the integrated support application 112 may prompt the user to generate or open a support ticket or otherwise escalate the technical support session, as described above.

In an example, the integrated support application 112 includes a machine intelligence extension 122. The messaging extension 118 may be an interface between the integrated support application 112 and a machine intelligence engine which implements the machine intelligence described herein. For example, the integrated support application 112 may provide information to and/or receive information from the machine intelligence engine via the machine intelligence extension 122. In some examples, the integrated support application 112, through the machine intelligence extension 122, interfaces with the machine intelligence engine via one or more APIs of the integrated support application 112 and/or the machine intelligence engine. In other examples, the integrated support application 112 itself includes or implements the machine intelligence engine.

Figure 2:
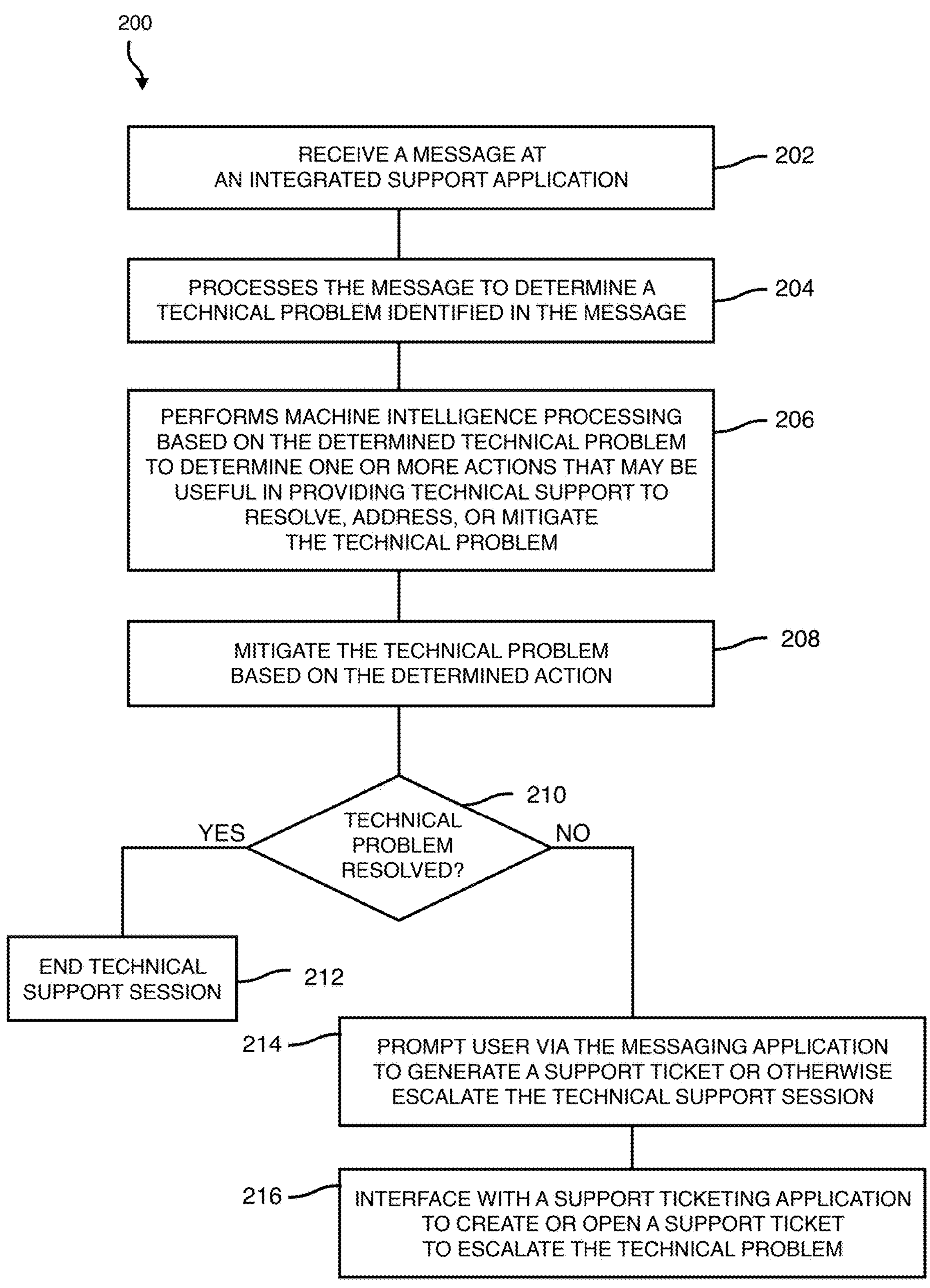
FIG. 2 is a flowchart of a method for data security through partial distribution according to an example of the disclosure.

FIG. 2 is a flowchart of a method 200 for automated handling of technical support, in accordance with various examples. In some examples, the method 200 is implemented to at least partially automatically provide technical support to address, resolve, mitigate, or otherwise relate to a technical problem. The method 200 may be a computer-implemented method, such as implemented by a server or other computing device. In an example, the method 200 is implemented as a series of computer-executable instructions which may be stored in a non-transitory storage medium and be executed by a processor or processors. Responsive to execution, the instructions may cause the processor(s) and/or other components of the computing device to be configured or programmed in a particular state, or control the processor(s) or other components to perform one or more actions. In some examples, the method 200 is performed at least in part by the integrated support application 112, as described above herein.

At operation 202, a message is received by an integrated support application. In some examples, the integrated support application receives the message via interaction with a messaging application at least partially through an API of the integrated support application and/or an API of the messaging application. In this way, the integrated support application may read, retrieve, obtain, or otherwise receive the message from the messaging application.

At operation 204, the integrated support application processes the message to determine a technical problem identified in the message. In some examples, the integrated support application processes the message via a machine intelligence process, such as natural language processing, to determine a technical problem identified in the message.

At operation 206, the integrated support application performs machine intelligence processing based on the determined technical problem to determine one or more actions that may be useful in providing technical support to resolve, address, or mitigate the technical problem. In an example, the machine intelligence process (which may encompass AI and/or ML) may be trained based on one or more data sets. In various examples, the machine intelligence process may be trained based on previous communications with other users and/or literature/documentation related to various technical problems, which may or may not include the determined technical problem. In some examples, the machine intelligence process may be trained based on previous support interactions, such as actions performed by a support engineer to solve technical problems, based on survey responses from users indicating the usefulness of certain literature/documentation or actions in providing technical support, or the like. The training may be according to any suitable machine intelligence training process, the scope of which is not limited herein. Although not shown in FIG. 2, in various examples, the training may occur at any point in the method 200 preceding, or preceding and following, operation 206.

At operation 208, the integrated support application mitigates the technical problem based on the determined action. In some examples, mitigating the technical problem includes providing a message with a recommended action or series of actions to the user, such as by providing a message in the messaging application. The recommended action(s) may instruct the user to perform steps to implement the determined action. In other examples, mitigating the technical problem may include the integrated support application itself performing one or more steps to implement the determined action. For example, based on the machine intelligence, the integrated support application may identify one or more actions to take that may be useful in providing technical support. In some examples, the integrated support application performs one or more of the actions automatically. In other examples, the integrated support application prompts the user, such as via the messaging application or the user device, for permission to perform one or more of the actions. The actions may be actions performed on, or to, a user device, actions performed on, or to, a device to which the user device connects (such as a network, server, or the like), or a combination thereof. For example, the integrated support application may send a signal causing the user device to reset or power cycle, to reset a network connection of the user device, to restart an application executing on the user device, to clear a cache of the user device, or the like. Similarly, the integrated support application may send a signal causing a user account or password of the user to be reset, data to be provisioned (such as granting the user, user device, an application, or the like) with certain access privileges, or any other suitable actions, the scope of which is not limited herein.

At operation 210, the integrated support application may determine whether the technical problem has been resolved. To determine whether the technical problem has been resolved, in some examples, the integrated support application may present the user with a survey or other feedback opportunity. For example, the integrated support application may present the user with a query via the messaging application to determine whether the technical problem has been resolved. Responsive to an affirmative response from the user, at operation 212, the integrated support application may end the technical support session. Responsive to the user providing a negative response, the integrated support application may present the user, at operation 214, with a prompt, via the messaging application, to generate a support ticket or otherwise escalate the technical support session.

At operation 216, responsive to the user interacting with the prompt in the messaging application, the integrated support application may interface with a support ticketing application to create or open a support ticket to escalate the technical problem. The integrated support application may provide a notification in the messaging application that the support ticket has been created, as well as provide information related to the support ticket, such as a link to the support ticket, a ticket number, a date and time at which the support ticket was generated, or the like.

Although not shown in FIG. 2, in various examples one or more additional actions may be performed at operation 216, or following operation 216. For example, the integrated support application may operate as a relay or middleman between the support ticketing application (or another support application) and the messaging application. In this role, the integrated support application may provide messages posted by a support engineer in the support ticketing or other support application to the user in the messaging application, and vice versa.

Also, in some examples, the integrated support application may present the user with a survey or other feedback opportunity during, or following, a technical support session. For example, the integrated support application may present the user with a query via the messaging application to determine whether the technical problem has been resolved. Responsive to an affirmative response from the user, the integrated support application may prompt the user to close the support ticket and/or may end the technical support session. In some examples, the integrated support application may present the user with a survey or other feedback opportunity during, or following, a technical support session. The integrated support application may train, or refine the training, of the machine intelligence process based on that feedback. Based on this feedback and training process, handling by the integrated support application of a given technical problem presented by a user may be modified in a second technical support session based on feedback presented by another user responsive to a first technical support session preceding the second technical support session.

Figure 3:
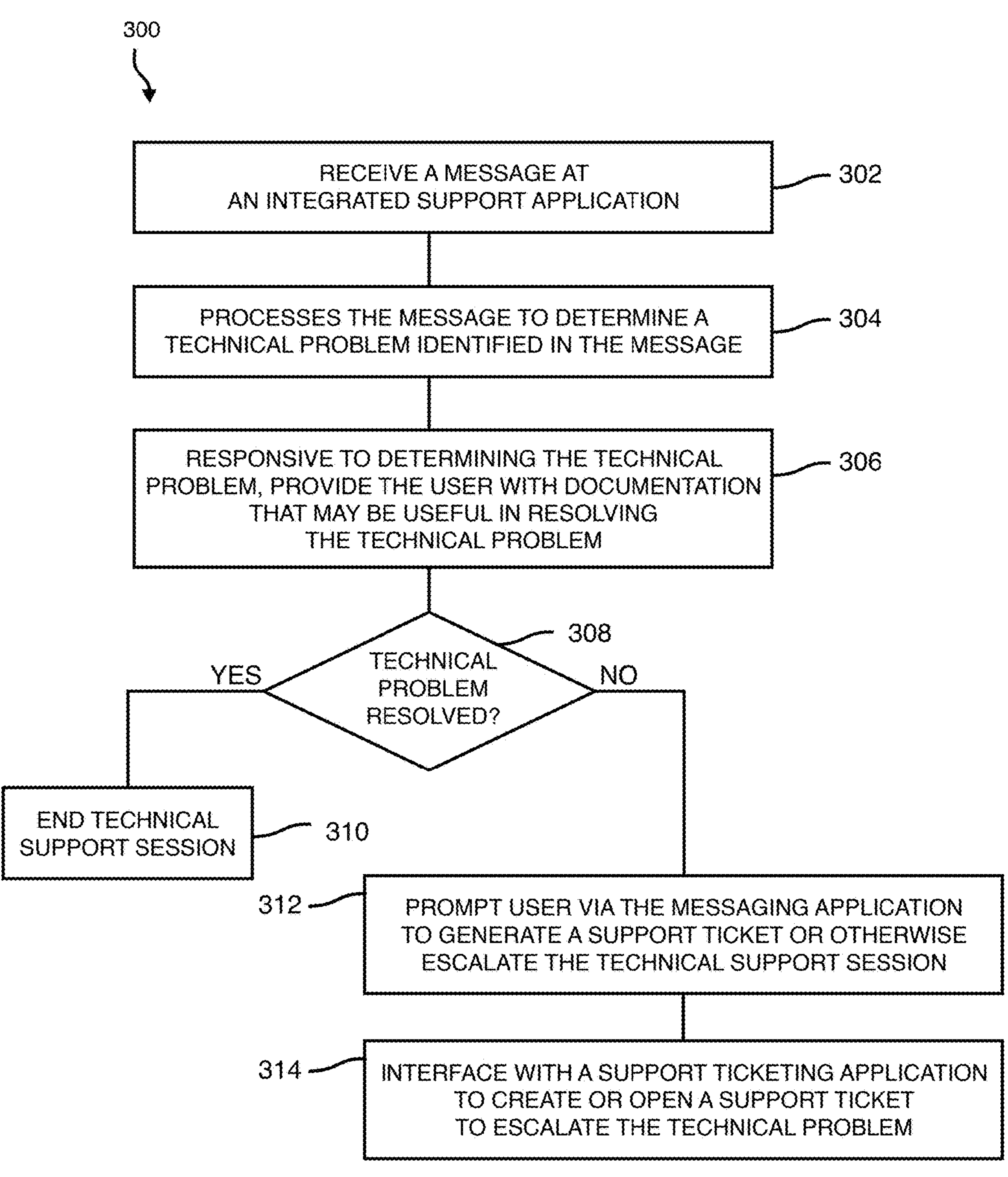
FIG. 3 is a flowchart of a method for data security through partial distribution according to an example of the disclosure.

FIG. 3 is a flowchart of a method 300 for automated handling of technical support, in accordance with various examples. In some examples, the method 300 is implemented to at least partially automatically provide technical support to address, resolve, mitigate, or otherwise relate to a technical problem. The method 300 may be a computer-implemented method, such as implemented by a server or other computing device. In an example, the method 300 is implemented as a series of computer-executable instructions which may be stored in a non-transitory storage medium and be executed by a processor or processors. Responsive to execution, the instructions may cause the processor(s) and/or other components of the computing device to be configured or programmed in a particular state, or control the processor(s) or other components to perform one or more actions. In some examples, the method 300 is performed at least in part by the integrated support application 112, as described above herein.

At operation 302, a message is received by an integrated support application. In some examples, the integrated support application receives the message via interaction with a messaging application at least partially through an API of the integrated support application and/or an API of the messaging application. In this way, the integrated support application may read, retrieve, obtain, or otherwise receive the message from the messaging application.

At operation 304, the integrated support application processes the message to determine a technical problem identified in the message. In some examples, the integrated support application processes the message via a machine intelligence process, such as natural language processing, to determine a technical problem identified in the message.

At operation 306, responsive to determining the technical problem, the integrated support application provides the user with documentation that may be useful in resolving the technical problem. For example, based on the information related to the technical problem, the integrated support application may search a data store, the Internet, or another data source for documentation, support documents, or other written materials related to the technical problem or which may be useful in mitigating, resolving, or otherwise addressing the technical problem. The integrated support application may provide one or more of the identified documentation to the user by providing a message in the messaging application, such as providing a link to the documentation, providing a copy of the documentation, or the like.

Although not shown in FIG. 3, in some examples, the integrated support application may provide a first documentation and, responsive to the user indicating that the first documentation did not resolve the technical problem, may provide a second (or further subsequent) documentation until all documentation related to the technical problem and identified by the integrated support application has been provided to the user, until a programmed number of documentation related to the technical problem and identified by the integrated support application has been provided to the user, or the like.

At operation 308, the integrated support application determines whether the technical problem has been resolved. To determine whether the technical problem has been resolved, in some examples, the integrated support application may present the user with a survey or other feedback opportunity. For example, the integrated support application may present the user with a query via the messaging application to determine whether the technical problem has been resolved. Responsive to an affirmative response from the user, at operation 310, the integrated support application may end the technical support session. Responsive to the user providing a negative response, the integrated support application may present the user, at operation 312, with a prompt, via the messaging application, to generate a support ticket or otherwise escalate the technical support session.

At operation 314, responsive to the user interacting with the prompt in the messaging application, the integrated support application may interface with a support ticketing application to create or open a support ticket to escalate the technical problem. The integrated support application may provide a notification in the messaging application that the support ticket has been created, as well as provide information related to the support ticket, such as a link to the support ticket, a ticket number, a date and time at which the support ticket was generated, or the like.

Although not shown in FIG. 3, in various examples one or more additional actions may be performed at operation 314, or following operation 314. For example, the integrated support application may operate as a relay or middleman between the support ticketing application (or another support application) and the messaging application. In this role, the integrated support application may provide messages posted by a support engineer in the support ticketing or other support application to the user in the messaging application, and vice versa.

Also, in some examples, the integrated support application may present the user with a survey or other feedback opportunity during, or following, a technical support session. For example, the integrated support application may present the user with a query via the messaging application to determine whether the technical problem has been resolved. Responsive to an affirmative response from the user, the integrated support application may prompt the user to close the support ticket and/or may end the technical support session. In some examples, the integrated support application may present the user with a survey or questionnaire to determine efficacy of the interaction with the integrated support application for resolving the technical problem, usefulness of various documentation provided by the integrated support application to the user, or any other information which may be useful in refining or modifying operation of the integrated support application for subsequent interactions with users, technical support sessions, or the like.

Figure 4:
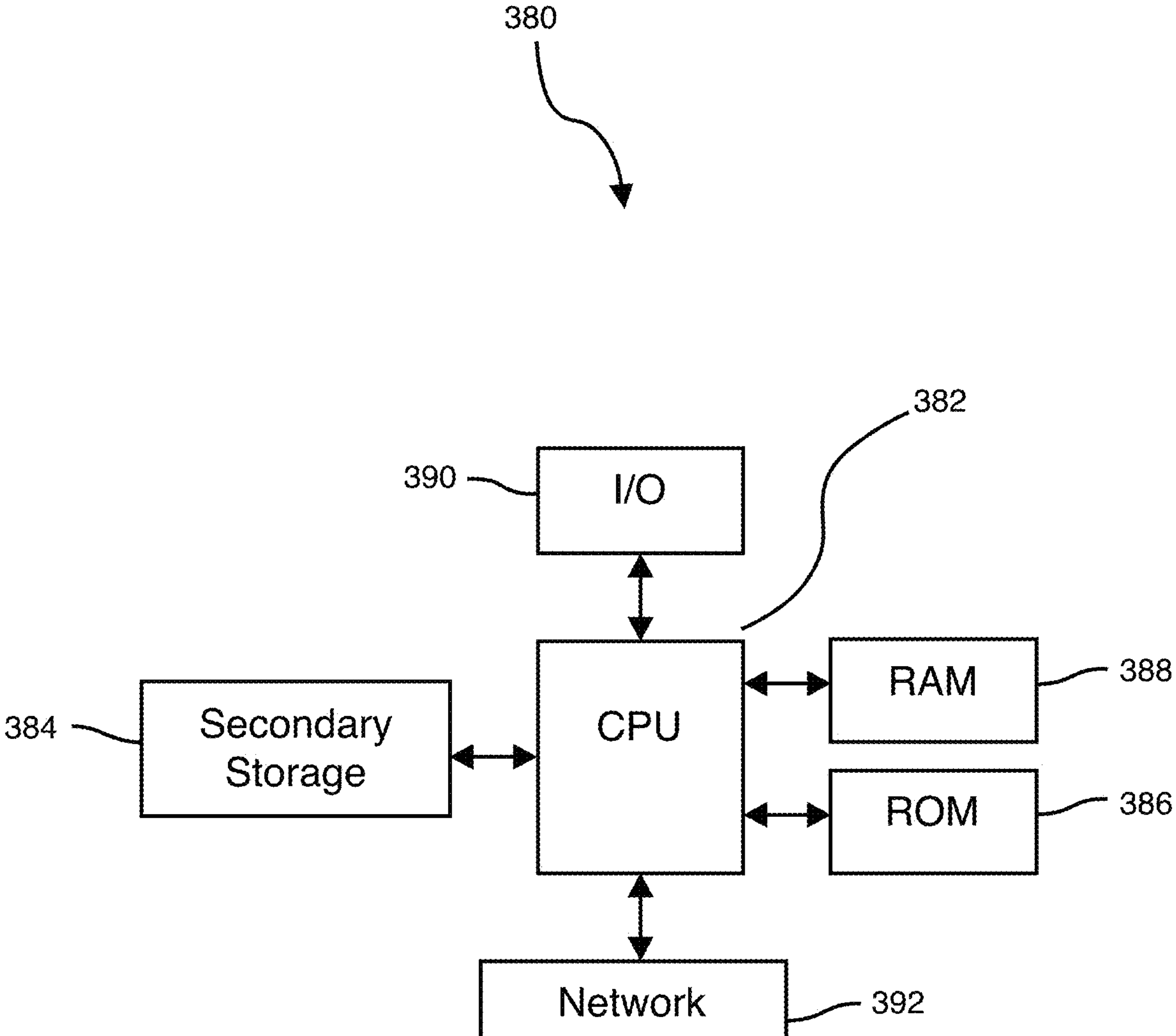
FIG. 4 is a block diagram of a computer system according to an example of the disclosure.

FIG. 4 illustrates a computer system 380 suitable for implementing one or more examples disclosed herein. The computer system 380 includes a CPU 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The CPU 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an example, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, 5G LTE, or other radio communication protocols. These network connectivity devices 392 may enable the CPU 382 to communicate with the Internet or one or more intranets. With such a network connection, it is contemplated that the CPU 382 might receive information from the network, or might output information to the network in the course of performing the above-described method steps. Such information, which is often represented as a sequence of instructions to be executed using CPU 382, may be received from and outputted to the network, for example, in the form of a computer data signal embodied in a carrier wave.

Such information, which may include data or instructions to be executed using CPU 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The CPU 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one CPU 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an example, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an example, virtualization software may be employed by the computer system 380 to provide the functionality of a number of servers that is not directly bound to the number of computers in the computer system 380. For example, virtualization software may provide twenty virtual servers on four physical computers. In an example, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an example, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The CPU 382 may process the executable instructions and/or data structures in part by directly accessing the computer program product, for example by reading from a CD-ROM disk inserted into a disk drive peripheral of the computer system 380. Alternatively, the CPU 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM example of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the CPU 382 may comprise an internal RAM, an internal ROM, a cache memory, and/or other internal non-transitory storage blocks, sections, or components that may be referred to in some contexts as non-transitory computer readable media or computer readable storage media.

While several examples have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various examples as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for providing user technical support via an integrated support application that a messaging extension integrating messaging functionality into the integrated support application and a support ticketing extension integrating support ticketing into the integrated support application, the system comprising:

a data store;

a server storing the integrated support application having the messaging extension and the support ticketing extension, the integrated support application configured to:

receive, from a messaging application and via an application programming interface of the messaging application, a message from a user, wherein the message initiates a technical support session;

process the message via machine intelligence processing to determine a technical problem identified in the message;

responsive to determining the technical problem, perform an action determined by the machine intelligence processing trained based on previous support interactions to mitigate the technical problem, the action comprising sending a signal to a device associated with the user to cause at least one of the device to power cycle, a network connection of the device to reset, an application executing on the device to restart, or a cache of the device to clear;

responsive to the action resolving the technical problem and without user action:

terminate the technical support session;

automatically generate a first support ticket for tracking the technical problem and efficacy of actions taken by interfacing, via the support ticketing extension, with a support ticketing application;

record information related to the technical support session; and automatically close the first support ticket as resolved by interfacing, via the support ticketing extension, with the support ticketing application.

2. The system of claim 1, wherein the integrated support application is configured to process the message according to the machine intelligence processing to determine the technical problem identified in the message.

3. The system of claim 1, wherein to perform the action to mitigate the technical problem, the integrated support application is configured to determine and provide written documentation related to the technical problem to the user via the messaging application.

4. The system of claim 1, wherein to perform the action to mitigate the technical problem, the integrated support application is configured to perform the machine intelligence processing based on the technical problem to determine the action.

5. The system of claim 4, wherein the integrated support application is configured to query the user, via the messaging application, for feedback to determine effectiveness of the action in mitigating the technical problem, and wherein the integrated support application is configured to train the machine intelligence processing based on the feedback.

6. The system of claim 1, wherein the integrated support application is configured to function as a relay for messages between the messaging application and the support ticketing application.

7. The system of claim 1, wherein to process the message to determine the technical problem identified in the message, the integrated support application is configured to perform natural language processing on the message.

8. A method for performing user technical support via an integrated support application that integrates messaging, support ticketing, and automatic problem resolution, the method implemented by a computer system and comprising:

receiving, at the integrated support application from a messaging application and via an application programming interface of the messaging application, a message from a user, wherein the message initiates a technical support session;

processing, by the integrated support application, the message to determine a technical problem identified in the message;

responsive to determining the technical problem, performing, via the integrated support application, machine intelligence processing trained based on previous support interactions and survey responses from users based on the determined technical problem to determine at least one action useful in mitigating the determined technical problem;

mitigating, via the integrated support application, the determined technical problem based on the determined action, wherein the mitigating comprising sending a signal to a device associated with the user to cause at least one of the device to power cycle, a network connection of the device to reset, an application executing on the device to restart, or a cache of the device to clear;

responsive to the determined action resolving the determined technical problem:

terminating, via the integrated support application, the technical support session;

automatically generating a first support ticket for tracking the determined technical problem and efficacy of the determined action;

recording information related to the technical support session; and automatically closing the first support ticket as resolved.

9. The method of claim 8, wherein processing the message to determine the technical problem identified in the message includes performing natural language processing on the message.

10. The method of claim 8, wherein mitigating the determined technical problem based on the determined action includes providing, in the messaging application, a recommendation to the user to perform the determined action.

11. The method of claim 8, wherein mitigating the determined technical problem based on the determined action includes performing the determined action automatically and without action by the user to initiate the determined action after the determination of the determined action.

12. The method of claim 8, wherein generating the support ticket includes:

prompting the user, via the messaging application, to open the support ticket;

responsive to an affirmative response from the user, interfacing with the support ticketing application to generate the support ticket without further action from the user, wherein the interfacing provides the support ticket with information related to actions taken in the technical support session; and reporting, in the messaging application, an identity of the support ticket.

13. The method of claim 8, further comprising:

querying the user to determine feedback indicating whether the determined action resolved the determine technical problem; and training the machine intelligence processing based on the feedback to modify handling of a subsequent technical support session.

14. A method for performing user technical support via an integrated support application that integrates messaging, support ticketing, and automatic problem resolution, the method implemented by a computer system and comprising:

receiving, at an integrated support application from a messaging application and via an application programming interface of the messaging application, a message from a user, wherein the message initiates a technical support session;

processing, via the integrated support application, the message to determine, via machine intelligence processing, a technical problem identified in the message;

responsive to determining the technical problem, identifying, via the integrated support application, written materials related to the determined technical problem;

providing, via the integrated support application, access to the written materials to the user via the messaging application;

responsive to the written materials resolving the determined technical problem:

terminating, via the integrated support application, the technical support session;

automatically generating a first support ticket for tracking the determined technical problem and efficacy of the written materials;

recording information related to the technical support session; and automatically closing the first support ticket as resolved; and responsive to the written materials not resolving the determined technical problem, performing an action determined by the machine intelligence processing trained based on previous support interactions to mitigate the determined technical problem, the action comprising sending a signal to a device associated with the user to cause at least one of the device to power cycle, a network connection of the device to reset, an application executing on the device to restart, or a cache of the device to clear.

15. The method of claim 14, wherein responsive to the written materials not resolving the determined technical problem and before generating the support ticket in the support ticketing application, the method further comprises:

performing machine intelligence processing based on the determined technical problem to determine at least one action useful in mitigating the determined technical problem;

mitigating the determined technical problem based on the determined action;

responsive to the determined action resolving the determined technical problem, terminating the technical support session; and responsive to the determine action not resolving the determined technical problem, generating the support ticket in the support ticketing application.

16. The method of claim 14, wherein processing the message to determine the technical problem identified in the message includes performing natural language processing on the message.

17. The method of claim 14, identifying the written materials related to the determined technical problem includes searching at least some of a data store or performing an Internet search based on keywords associated with the determined technical problem to identify the written materials.

18. The method of claim 14, wherein generating the support ticket includes:

prompting the user, via the messaging application, to open the support ticket;

responsive to an affirmative response from the user, interfacing with the support ticketing application to generate the support ticket without further action from the user, wherein the interfacing provides the support ticket with information related to actions taken in the technical support session; and reporting, in the messaging application, an identity of the support ticket.

19. The method of claim 14, further comprising:

receiving a first message from a support person in the support ticketing application;

providing the first message to the user in the messaging application;

receiving a second message from the user in the messaging application; and providing the second message to the support person in the support ticketing application.

20. The method of claim 14, further comprising:

querying the user to determine feedback indicating effectiveness of the technical support session in mitigating the determined technical problem; and modifying handling of a subsequent technical support session responsive to the feedback.

* * * * *